(12) United States Patent
Dieter et al.

(10) Patent No.: US 11,727,793 B2
(45) Date of Patent: Aug. 15, 2023

(54) METHOD AND SYSTEM FOR GENERATING MOTION PROFILES AND TRAFFIC NETWORK

(71) Applicant: VITRONIC Dr.-Ing. Stein Bildverarbeitungssysteme GmbH, Wiesbaden (DE)

(72) Inventors: Jochen Dieter, Wiesbaden (DE); Bernhard Minge, Taunusstein (DE); Tim Bissé, Wiesbaden (DE)

(73) Assignee: VITRONIC DR.-ING. STEIN BILDVERARBEITUNGSSYSTEME GMBH, Wiesbaden (DE)

( * ) Notice: Subject to any disclaimer, the term of this patent is extended or adjusted under 35 U.S.C. 154(b) by 358 days.

(21) Appl. No.: 17/034,887

(22) Filed: Sep. 28, 2020

(65) Prior Publication Data

US 2021/0097853 A1 Apr. 1, 2021

(30) Foreign Application Priority Data

Sep. 27, 2019 (EP) ..................... 19200180

(51) Int. Cl.
*G08G 1/01* (2006.01)
(52) U.S. Cl.
CPC ........... *G08G 1/0116* (2013.01); *G08G 1/012* (2013.01); *G08G 1/0133* (2013.01); *G08G 1/0141* (2013.01)

(58) Field of Classification Search
None
See application file for complete search history.

(56) References Cited

U.S. PATENT DOCUMENTS

| | | | |
|---|---|---|---|
| 2009/0174777 A1* | 7/2009 | Smith | G08G 1/052 382/104 |
| 2016/0104357 A1 | 4/2016 | Miyano | |
| 2018/0211116 A1 | 7/2018 | Modi et al. | |

FOREIGN PATENT DOCUMENTS

| | | |
|---|---|---|
| EP | 2838075 | 2/2015 |
| WO | 2017015297 | 1/2017 |

* cited by examiner

*Primary Examiner* — James M McPherson
*Assistant Examiner* — Bakari Underwood
(74) *Attorney, Agent, or Firm* — Burris Law, PLLC

(57) ABSTRACT

Method and system for generating movement profiles of traffic participants in a traffic network with at least two acquisition stations, wherein image data of the traffic participants are acquired by means of sensors of the acquisition stations and evaluated by means of an evaluation device, wherein data sets with feature data of the traffic participants are generated from the image data and wherein the data sets of different acquisition stations are compared.

20 Claims, 3 Drawing Sheets

METHOD AND SYSTEM FOR GENERATING MOTION PROFILES AND TRAFFIC NETWORK

CROSS-REFERENCE TO RELATED APPLICATIONS

This application claims priority to and the benefit of EP 19200180.8, filed on Sep. 27, 2019. The disclosures of the above applications are incorporated herein by reference.

FIELD

The present disclosure relates to a method and a system for generating movement profiles of traffic participants in a traffic network with at least two acquisition stations, wherein image data of the traffic participants are acquired by means of sensors of the acquisition stations and evaluated by means of an evaluation device, wherein data sets with feature data of the traffic participants are generated from the image data and wherein the data sets of different acquisition stations are compared.

BACKGROUND

The statements in this section merely provide background information related to the present disclosure and may not constitute prior art.

Such methods are used, for example, for monitoring speed limits in road traffic by means of so-called section control, in which the speed is not measured at a specific point, but the average speed over a longer distance between two acquisition stations is determined.

From EP 2 838 075 A1, a procedure for detecting the exceeding of a permissible maximum speed on a section of road is known, in which the passing of a vehicle is detected at a first station and a data set for the vehicle is stored at the first station. The passing of the said vehicle at a second station located behind the first station in the direction of travel is detected and a data set on the vehicle is stored in the second station. Based on the distance between the first station and the second station and the time difference between the detection of the passing of the first station and the detection of the passing of the second station, the average speed over the section between the first station and the second station is determined. Legal data protection requirements desire data sets are encrypted before transmission and that only those data sets that have been assigned to exceed the speed limit are retrievable from the stations and can be decrypted. The remaining data sets are not intended to be used.

SUMMARY

This section provides a general summary of the disclosure and is not a comprehensive disclosure of its full scope or all of its features.

The present disclosure provides a method and a system of the type mentioned above, in which data sets with feature data of traffic participants are used to generate motion profiles of traffic participants in a traffic network.

According to an aspect, the method provides that in the event of a match between the feature data of two data sets, a plausibility that the two data sets are related to one and the same traffic participant is determined, taking into account information assigned to each data set about a location and a time of acquisition of the respective image data, and wherein a movement profile of the traffic participant is generated if the determined plausibility exceeds a threshold.

An advantage of the method is that by determining the plausibility, in addition to the comparison of the data sets, it is possible to assign ambiguous feature data of the data sets to a traffic participant. The ambiguous feature data of the data sets can thus contain so little information that, for example, no personal identification is possible. In this way, data protection requirements can be met and all data sets are generally available for generating movement profiles of traffic participants. The plausibility is determined on the basis of the information assigned to the data sets about the respective place and time of the image data acquisition, i.e. also advantageously on the basis of non-personal data.

The method can be used advantageously in different traffic networks, for example in an urban or supraregional road network. The traffic participants are in particular vehicles. In principle, the method can also be applied to persons in a public transport network or a pedestrian area as a traffic network. Acquisition stations in the sense of the disclosure are devices at which image data of the traffic participants are recorded by means of sensors. The acquisition stations are mostly stationary. Two acquisition stations allow the generation of motion profiles of traffic participants between these two stations. Preferably, more than two acquisition stations are provided in the traffic network. The evaluation device in the sense of the disclosure is a data processing device which allows an evaluation of the digital image data recorded by the sensors. The evaluation device generates and stores the data sets with the feature data of the traffic participants. In the sense of the disclosure, feature data of the traffic participants are data which basically enable the recognition of one and the same traffic participant by comparing two data sets. However, in the sense of the disclosure it is particularly not intended that the traffic participant can be unambiguously identified by means of the feature data. Therefore, in the sense of the disclosure, the matching of the feature data of two data sets means in particular a partial matching of the feature data or a similarity of the feature data. For example, the feature data of a vehicle as a traffic participant may be its color and its length stored in the data set.

The plausibility in the sense of the disclosure is a value which indicates whether two data sets with matching feature data are related to one and the same traffic participant, i.e. whether they were generated from image data of the same traffic participant. The plausibility may be, for example, a binary value that indicates either that the matching feature data was generated from image data of the same traffic participant or that this is not the case. Alternatively, the plausibility can be a probability value indicating the probability that the matching feature data was generated from image data of the same traffic participant. In the sense of the disclosure, a sufficient value of the determined plausibility is a predetermined threshold value, which the plausibility has to exceed so that the two data sets with matching feature data are considered for generating the motion profile of the traffic participant.

To determine the plausibility, information assigned to the data sets about a place and time of the acquisition of the respective image data is used. The location is the position of the respective acquisition station in the traffic network where the image data was acquired. From the locations of two acquisition stations a distance is derived and from the times at which the respective image data was acquired, for example, a speed at which a traffic participant is moving can be determined, if the matching feature data was actually generated from image data of the same traffic participant. The speed calculated in this way can, for example, be assigned a plausibility using an assignment table. For example, a plausibility with the lowest possible value can be assigned to physically unreachable high speeds. The same applies to low speeds, where even if the data sets do indeed originate from one and the same traffic participant, the data sets are not suitable for generating a motion profile of the traffic participant, since they may not have taken the direct route from one station to the next, or may have remained motionless for a longer period of time.

The skilled person recognizes that the proposed method is advantageous because it does not depend on complete monitoring of the traffic in the traffic network or on recognizing all traffic participants. In order to draw conclusions about the traffic flow from the motion profiles, it is sufficient to generate a motion profile for a portion of the traffic participants, for example ten percent of the traffic participants. Data sets for which no other data set with matching feature data is found within a certain period of time can be deleted, for example, because the traffic participant is motionless, has left the traffic network without being recorded again, or could not be recorded.

According to one form of the present disclosure, the plausibility is determined by taking into account information about the direction of travel of the respective traffic participant assigned to the data sets during the acquisition of the image data. If the acquisition station, at which the image data was acquired at a later point in time, is positioned along the direction of travel of the traffic participant, the plausibility can be increased, since it is to be expected that the traffic participant in question will pass the next acquisition station positioned in his direction of travel. In addition, the plausibility may be determined by taking into account a degree of similarity of the feature data of the data sets. Further, the feature data may be evaluated on the basis of a weighting (i.e., using a weighting function). Certain feature data can be weighted higher, if they are more significant for the plausibility. For example, a matching vehicle color of the traffic participant contributes little to the plausibility, whereas a matching of a side lettering, for example, indicates a higher plausibility. On the other hand, a non-matching vehicle color is high weighted and reduces the plausibility, e.g. to zero, even if the other feature data match very closely.

An advantage of the method is that the data sets may only contain such feature data of the traffic participants that allows for an unspecific association. The storage and processing of data, which, for example, allows a clear association with an individual, can be omitted in order to be able to apply the method in accordance with the applicable data protection regulations.

A further aspect refers to a system for generating motion profiles of traffic participants according to the method described above. The system comprises at least two acquisition stations in a traffic network, each acquisition station comprising at least one sensor for acquiring the image data of the traffic participants, at least one evaluation device for evaluating the image data, and at least one communication link for transmitting data.

As the sensor for acquiring the image data, an imaging sensor can advantageously be used, in particular an optical sensor. The sensors preferably comprise one or more of the following types of sensors: a camera, a 3D laser scanner, a radar.

According to another form of the present disclosure of the system, a central processing station is provided, where the central processing station is connected to the acquisition stations via the communication link. The central processing station comprises a data processing device that is adapted to compare the data sets of different acquisition stations and, in the event of a match between the feature data of two data sets, to determine the plausibility that the two data sets are related to the same traffic participant.

In accordance with a further form of the system, several decentralized processing stations are provided, wherein the decentralized processing stations are each connected via the communication link to at least two of the acquisition stations and wherein the decentralized processing stations each have a data processing device which is adapted to compare the data sets of different acquisition stations and, in the event of a coincidence of the feature data of two data sets, to determine the plausibility that the two data sets are related to one and the same traffic participant.

Another aspect of the present disclosure refers to a multidimensional traffic network with the system described above. The multidimensional traffic network comprises at least two lanes, which run in different directions and which intersect each other at least once, and crossroads.

In the following, the aspects of the disclosure will be explained in more detail by means of various forms and variations with reference to the attached drawings. The description refers to the method as well as to the system.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
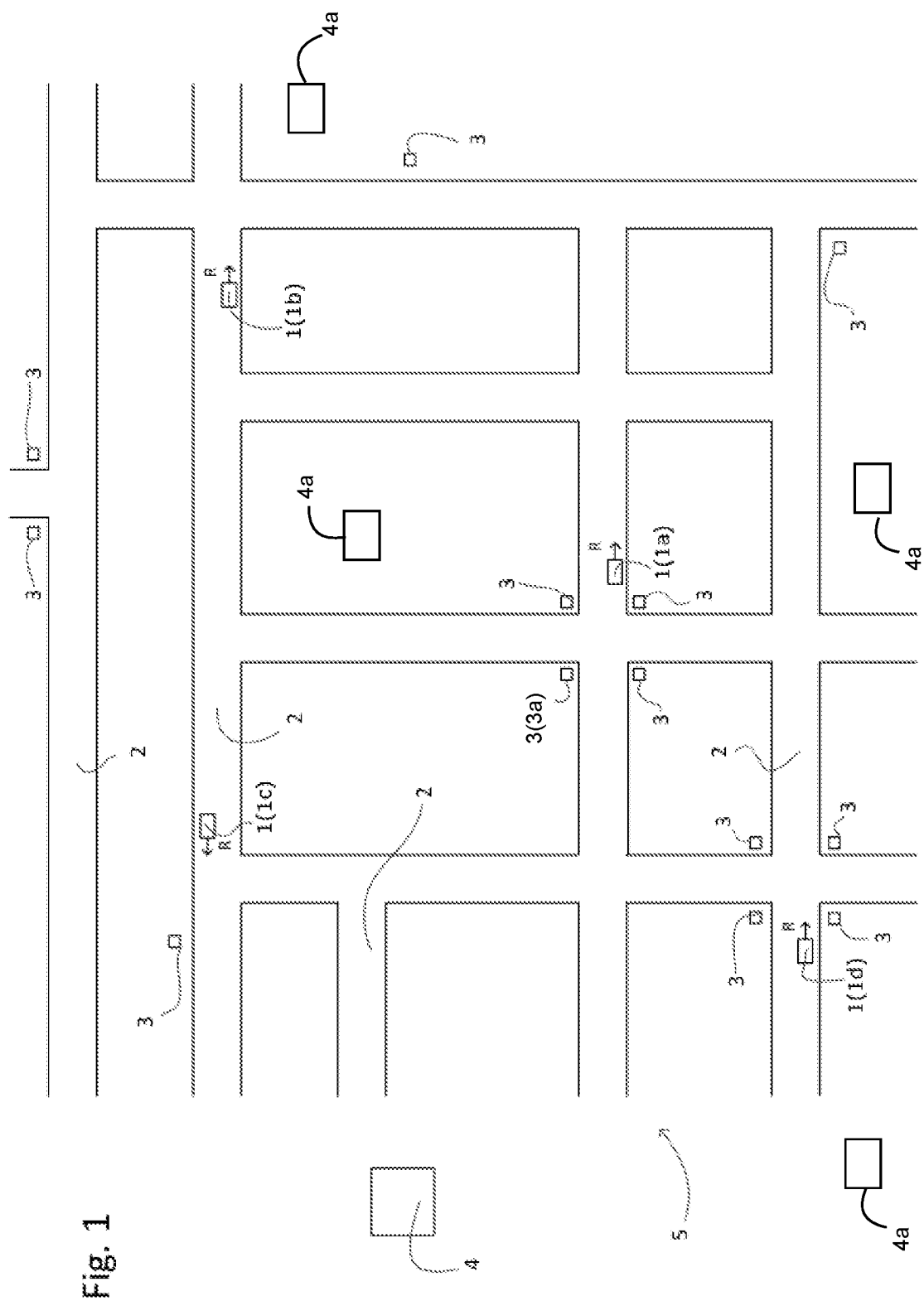
FIG. 1 shows a multi-dimensional traffic network with one form of a system according to the present disclosure for generating motion profiles of traffic participants at a first point in time.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 schematically shows a multidimensional traffic network 5 with several acquisition stations 3, wherein each acquisition station 3 has at least one sensor 3a (only one shown), e.g. a camera, a 3D laser scanner or a radar, to acquire image data of traffic participants 1. The image data are evaluated with a not depicted evaluation device, wherein the evaluation device can be located in the respective acquisition station 3 or in a central processing station 4.

Furthermore, at least one not depicted communication link is provided for the transmission of data. The central processing station 4 is connected to the acquisition stations 3, in particular via the communication link. Alternatively, several decentralized processing stations 4a may be provided, in which case the decentralized processing stations 4a are each connected via the communication link with at least two of the acquisition stations 3.

The evaluation devices generate data sets with feature data of the traffic participants 1 from the image data. The central processing station 4, or alternatively several decentralized processing stations 4a, have a data processing device which is adapted to compare the data sets of different acquisition stations 3. If the feature data of two data sets match, a plausibility check is performed to determine whether the two data sets are related to the same traffic participant 1. The information assigned to the data sets about a respective place and time of image data acquisition is taken into account. If the determined plausibility is sufficient, a motion profile 6 (FIG. 3) of the traffic participant 1 is generated.

In particular, the plausibility is determined by detecting a first location at which the image data for a first of the two data sets was recorded and a second location at which the image data for a second of the two data sets was recorded, wherein a first time is determined, at which the image data for the first of the two data sets is recorded and a second time at which the image data for the second of the two data sets was recorded is determined, wherein a speed of the traffic participant 1 is calculated from a distance between the first location and the second location and a time difference between the first time and the second time. Further, the plausibility can be determined by taking into account information assigned to the data sets about a direction of travel R of the respective traffic participant 1 during the acquisition of the image data. The plausibility can be determined advantageously additionally by taking into account a degree of similarity of the feature data of the data sets. According to the method the data sets need only to contain such feature data of the traffic participants that allow only an unspecific association of vehicles, e.g. the vehicle model, a vehicle type, a lettering or graphic design or the vehicle color. Such feature data allow for the recognition of the vehicle, but not for a clear association or identification of the traffic participant. It is also conceivable to read out a coding of a registration district or a registration country from the image data without reading out the entire registration plate or the entire registration data. The feature data are furthermore preferably evaluated on the basis of a weighting function, so that a match of a lettering, for example, is evaluated with a higher plausibility than a matching vehicle color. Certain feature data can also be given such a low weighting that they do not contribute to the plausibility score, such as a vehicle color that suggests a cab. If no data set with matching feature data is found within a predetermined time, the data set can be deleted. Feature data for the unambiguous recognition of traffic participants, such as vehicle license plates, are not acquired. The traffic participants can also be acquired only randomly. This is an advantageous way to guarantee data protection for persons, since, for example, no personal data are acquired.

From matching data sets of different acquisition stations 3 a spatial and temporal correlation to a movement of traffic participants 1 in the traffic network 5 is generated, wherein it is sufficient to acquire a part of the traffic participants 1. In order to acquire a passing of an acquisition station 3 by a traffic participant 1, the generated data sets of the distributed acquisition stations 3 are sent via a not depicted network to the central processing station 4, where the data sets are compared and evaluated. By acquiring one and the same traffic participant 1 at several acquisition stations 3, motion profiles 6 (FIG. 3) of individual vehicles 1 can be generated. Alternatively, individual acquisition stations 3 can be connected to their respective neighboring acquisition station 3 or to several acquisition stations 3 in the vicinity or to all acquisition stations 3 in a traffic network 5 via a communication network and exchange the data sets, wherein the comparison of the data sets of individual or several acquisition stations 3 takes place.

Based on the motion profiles 6 it is advantageous to generate traffic analyses and to determine travel times. A current traffic situation can be determined and the motion profiles 6 can be used to predict a future traffic situation from the current traffic situation.

All raw data, in particular the acquired image data, are stored in volatile memories and are deleted directly from the volatile memory after the data sets have been generated. Only non-personal data are stored for further processing or sent to the central processing station 4.

Figure 2:
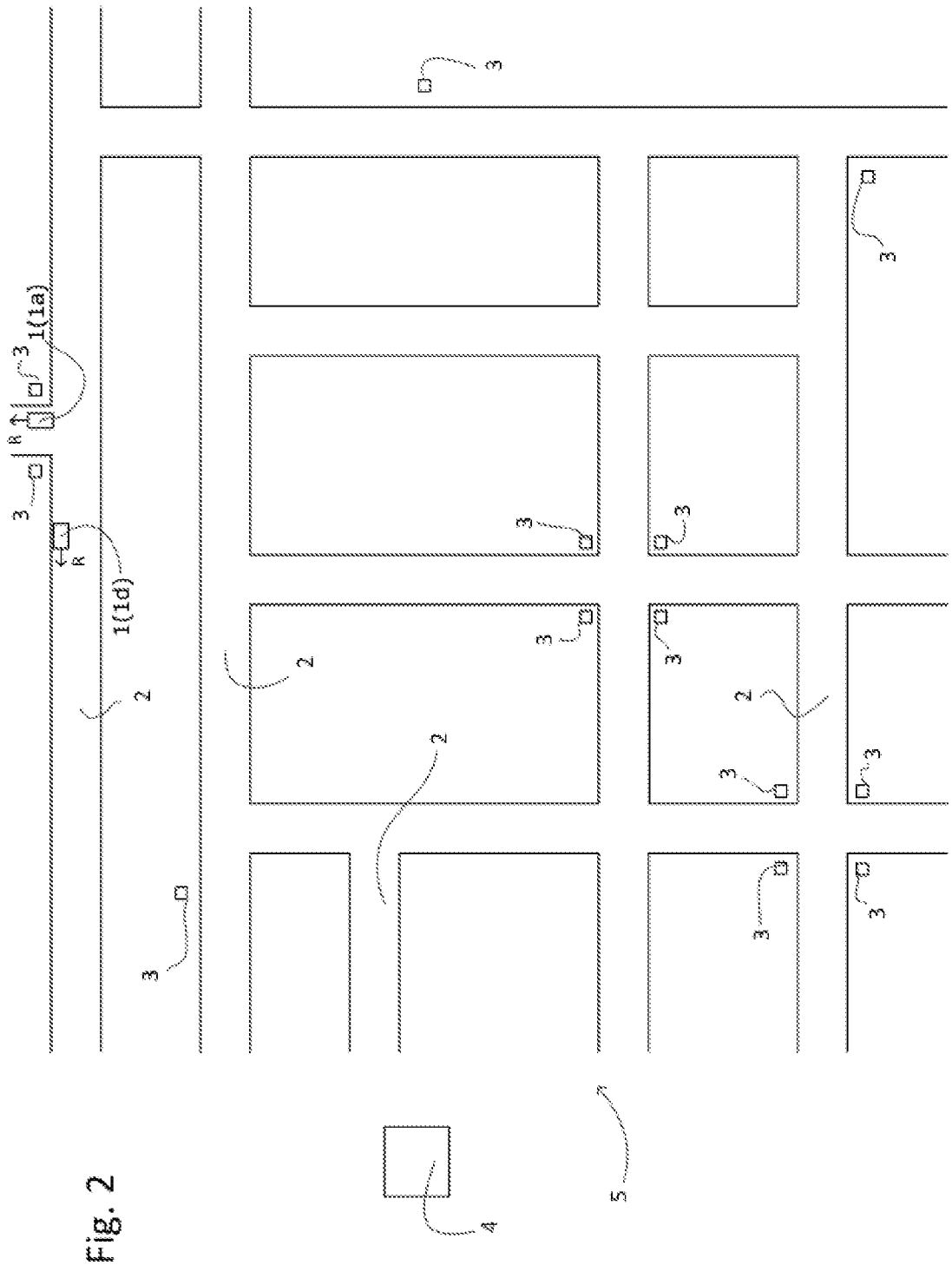
FIG. 2 shows the multidimensional traffic network according to FIG. 1 at a second point in time.

FIGS. 1 and 2 each show a traffic situation in the traffic network 5 with individual acquisition stations 3 at two different times with a time difference of about two minutes in a schematic view. The open traffic network 5 is for example a part of an urban area. The traffic participants 1 are for example vehicles a, b, c, d, which drive in different directions R indicated by direction arrows on lanes 2. At intersections of the lanes 2, the acquisition stations 3 can be installed on traffic light poles, for example. Or the acquisition stations 3 are for example mounted on lamp posts. Alternatively, temporary mobile acquisition stations 3 can also be installed and used or mobile acquisition stations 3 that are moving in road traffic can also be used. In this example, the acquisition stations 3 each have a camera. The acquisition stations 3 can also be equipped with 3D laser scanners.

The cameras located in the acquisition stations 3 take images of the traffic participants 1, i.e. the passing vehicles a, b, c, d within the traffic network 5. The feature data of the traffic participants 1 are generated from the image data. A data set with the feature data is generated for each acquired traffic participant 1. It includes vehicle features, such as the vehicle model, the vehicle type, i.e. car, truck, van or motorcycle, if applicable a vehicle lettering, an organization logo and/or the vehicle color. The vehicle registration number and a driver photo are deliberately not extracted from the image data. After the data set has been generated, the original image recordings are deleted directly from the volatile memory and only the data set with the feature data is sent to the central processing station 4, for example by wireless transmission. Afterwards, the processing station 4 can generate the motion profiles 6 of the traffic participants 1 within a certain time period from the data sets with feature data of all acquisition stations 3.

Figure 3:
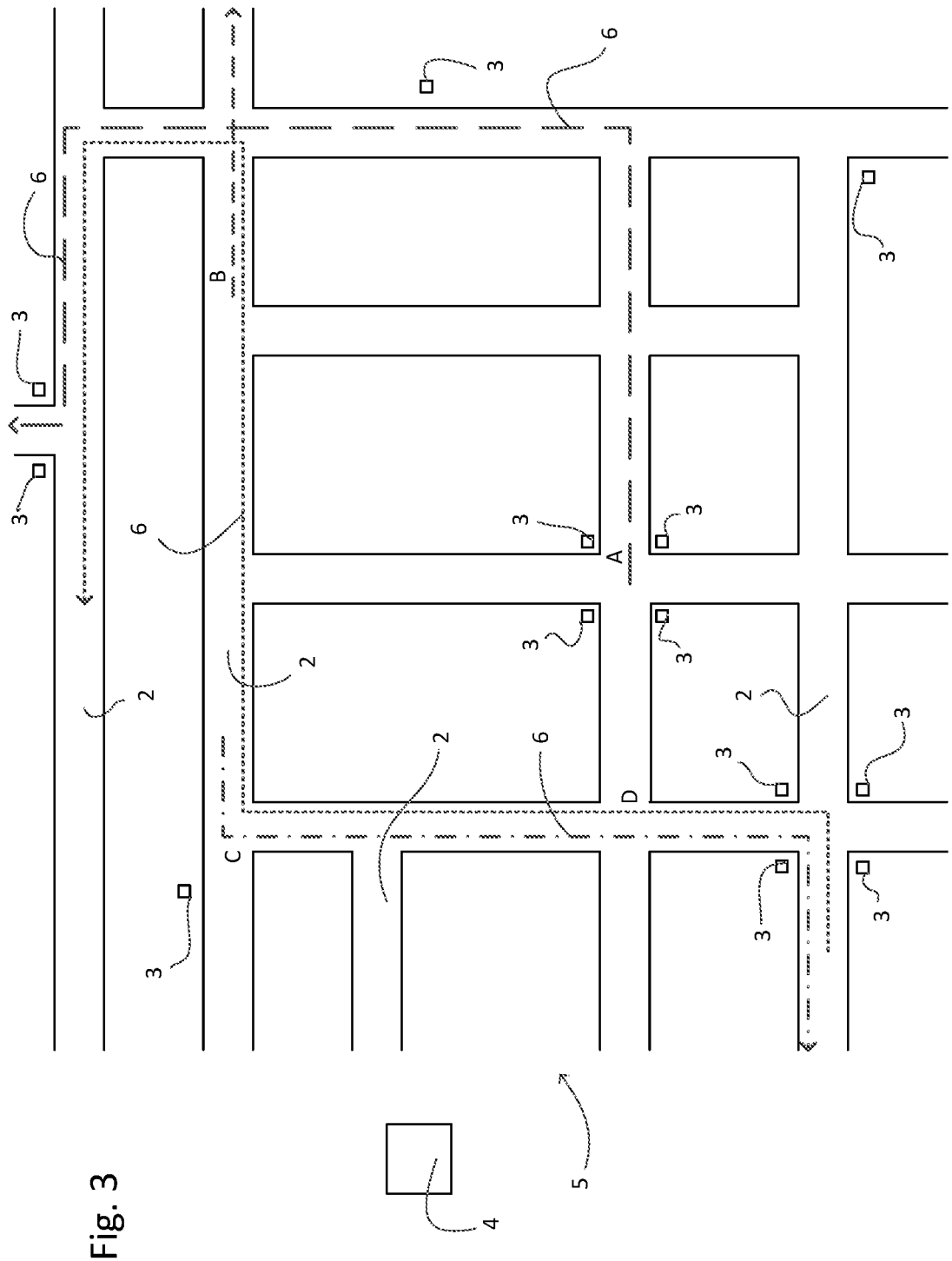
FIG. 3 shows examples of motion profiles of traffic participants in the multidimensional traffic network according to FIG. 1 generated by the method according to the present disclosure.

FIG. 3 shows the motion profiles A, B, C, D of the vehicles a, b, c, d. respectively, of FIGS. 1 and 2 within the time period of two minutes. The vehicle a has travelled a certain distance A, shown as a rough dotted line, in the direction north. Vehicle a is acquired by one of the acquisition stations 3 as shown in FIG. 1 and two minutes later by another of the acquisition stations 3 as shown in FIG. 2. The shortest distance between the two acquisition stations is 850 meters. If vehicle a follows this route, which is not known, vehicle a would have had an average speed of about 25 kilometers per hour. Such a realistic travel speed in city traffic is evaluated with a high plausibility according to the method. If vehicle a in FIG. 1, for example, would have driven in the opposite direction, this circumstance can be taken into account. The driving distance would be longer, for example twice as long. A resulting average speed of 50 kilometers per hour would still be possible in an urban area, but would be significantly less plausible. Vehicle d has travelled the distance D indicated by the fine dotted line. The vehicles b, c are no longer visible in FIG. 2, since these vehicles b, c have moved out of the depicted traffic network 5 after two minutes. The motion profile C of vehicle c is drawn as a dashed line, but cannot be generated by the system, because vehicle c only passes an intersection with acquisition stations 3 before it leaves the traffic network 5. The same applies to the motion profile B, since vehicle b is not acquired at all. The generated motion profiles A, D can be combined with other motion profiles from other traffic networks, e.g. in neighboring cities, which are not shown here, from which a dynamic and sustainable traffic space management system can be generated, wherein the privacy of the drivers and/or owners of the vehicles is protected and anonymized motion profiles 6 of traffic participants 1 are generated.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for generating motion profiles of traffic participants in a traffic network with more than two acquisition stations, the method comprising:
   acquiring image data of the traffic participants with sensors of the acquisition stations;
   evaluating the image data with an evaluation device;
   generating data sets with feature data of the traffic participants from the image data;
   deleting the image data after the data sets have been generated; and
   comparing the data sets of different acquisition stations;
   determining a plausibility that two data sets are related to one and the same traffic participant in the event of a match between the feature data of two data sets as a function of information assigned to each of the two data sets about a location and a time of acquisition of respective image data from which the two data sets were generated, and
   generating a motion profile of the traffic participant when the plausibility exceeds a threshold.

2. The method according to claim 1, wherein the plausibility is determined as a function of a speed of the traffic participant by determining a first location at which the image data for a first of the two data sets was recorded and by determining a second location at which the image data for a second of the two data sets was recorded, wherein a first time is determined at which the image data for the first of the two sets of data is recorded and a second time is determined at which the image data for the second of the two sets of data is recorded, wherein the speed of the traffic participant is calculated from a distance between the first location and the second location and a time difference between the first time and the second time.

3. The method according to claim 1, wherein the plausibility is determined taking into account information associated with the data sets about a direction of travel of the traffic participant during the acquisition of the image data.

4. The method according to claim 1, wherein the plausibility is determined taking into account a degree of similarity of the feature data of the data sets.

5. The method according to claim 4, wherein the feature data are evaluated by a weighting function.

6. The method according to claim 1, wherein the data sets contain only such feature data of traffic participants that allows for an unspecific association of vehicles.

7. The method according to claim 1, wherein the data sets contain at least one characteristic data of traffic participants selected from the group consisting of vehicle model, vehicle type, inscription, graphic design, coding of a registration district, coding of a registration country, and vehicle colour.

8. The method according to claim 1, wherein all data sets for which no data set with matching feature data is found within a predetermined time are deleted.

9. A system for generating motion profiles of traffic participants, the system comprising more than two acquisition stations in a traffic network, wherein each acquisition station is configured for detecting image data of the traffic participants, at least one evaluation device configured for evaluating the image data, and at least one communication link for transmitting data, wherein the system:
   acquires image data of the traffic participants with sensors of the acquisition stations;
   evaluates the image data with an evaluation device;
   generates data sets with feature data of the traffic participants from the image data;
   deletes the image data after the data sets have been generated;
   compares the data sets of different acquisition stations;
   determines a plausibility that two data sets are related to one and the same traffic participant in the event of a match between the feature data of two data sets as a function of information assigned to each of the two data sets about a location and a time of acquisition of respective image data from which the two data sets were generated; and
   generates a motion profile of the traffic participant when the plausibility exceeds a threshold.

10. The system according to claim 9 further comprising a central processing station, wherein the central processing station is connected to the acquisition stations via the communication link, and wherein the central processing station comprises a data processing device configured to compare the data sets of different acquisition stations and, in the event of a match between the feature data of the two data sets, determine the plausibility that the two data sets are related to one and the same traffic participant.

11. The system according to claim 9 further comprising a plurality of decentralized processing stations, wherein the decentralized processing stations are each connected to at least two of the acquisition stations via the communication link, and wherein the decentralized processing stations are each configured to compare the data sets of different detection stations and, in the event of a match of the feature data of the two data sets, to determine the plausibility that the two data sets are related to one and the same traffic participant.

12. The system according to claim 9, wherein the sensors comprise at least one a camera, a 3D laser scanner, and a radar.

13. The system according to claim 9, wherein the plausibility is determined as a function of a speed of the traffic participant by determining a first location at which the image data for a first of the two data sets was recorded and by determining a second location at which the image data for a second of the two data sets was recorded, wherein a first time is determined at which the image data for the first of the two sets of data is recorded and a second time is determined at which the image data for the second of the two sets of data is recorded, wherein the speed of the traffic participant is calculated from a distance between the first location and the second location and a time difference between the first time and the second time.

14. The system according to claim 9, wherein the plausibility is determined taking into account a degree of similarity of the feature data of the data sets.

15. The system according to claim 14, wherein the feature data are evaluated by a weighting function.

16. The system according to claim 9, wherein the data sets contain only such feature data of traffic participants that allows for an unspecific association of vehicles.

17. The system according to claim 9, wherein the data sets contain at least one characteristic data of traffic participants selected from the group consisting of vehicle model, vehicle type, inscription, graphic design, coding of a registration district, coding of a registration country, and vehicle colour.

18. The system according to claim 9, wherein all data sets for which no data set with matching feature data is found within a predetermined time are deleted.

19. A method for generating motion profiles of traffic participants in a traffic network with more than two acquisition stations, the method comprising:
  acquiring image data of the traffic participants with sensors of the acquisition stations;
  evaluating the image data with an evaluation device;
  generating data sets with feature data of the traffic participants from the image data;
  deleting the image data after the data sets have been generated;
  comparing the data sets of different acquisition stations;
  determining a plausibility that two data sets are related to one and the same traffic participant in the event of a match between the feature data of the two data sets as a function of information assigned to each of the two data sets about a location and a time of acquisition of respective image data from which the two data sets were generated; and
  generating a motion profile of the traffic participant when the plausibility exceeds a threshold, wherein the plausibility is determined as a function of a speed of the traffic participant by determining a first location at which the image data for a first of the two data sets was recorded and by determining a second location at which the image data for a second of the two data sets was recorded, wherein a first time is determined at which the image data for the first of the two sets of data is recorded and a second time is determined at which the image data for the second of the two sets of data is recorded, wherein the speed of the traffic participant is calculated from a distance between the first location and the second location and a time difference between the first time and the second time.

20. The method according to claim 19, wherein the plausibility is determined taking into account information associated with the data sets about a direction of travel of the traffic participant during the acquisition of the image data.

\* \* \* \* \*